United States Patent [19]

Vassar

[11] 4,256,685
[45] Mar. 17, 1981

[54] VARIABLE PROFILE EXTRUSION METHOD

[75] Inventor: Clyde W. Vassar, Winooski, Vt.

[73] Assignee: W. James Kemerer, Long Beach, Calif. ; a part interest

[21] Appl. No.: 963,290

[22] Filed: Nov. 24, 1978

Related U.S. Application Data

[62] Division of Ser. No. 815,699, Jul. 5, 1977, Pat. No. 4,187,068.

[51] Int. Cl.³ .............................................. B29F 3/04
[52] U.S. Cl. .................................. 264/167; 264/177 R
[58] Field of Search ........................... 264/167, 177 R; 425/381, 465, 466

[56] References Cited

U.S. PATENT DOCUMENTS

| | | | |
|---|---|---|---|
| 2,365,482 | 12/1944 | Manken et al. | 425/381 |
| 2,392,336 | 1/1946 | Nissen | 425/381 |
| 2,793,598 | 5/1957 | Rivoche | 425/381 |
| 3,021,003 | 2/1962 | Bluck | 425/465 |
| 3,871,812 | 3/1975 | Phipps | 425/381 |
| 3,914,085 | 10/1975 | Kruelskie | 425/381 |
| 3,932,090 | 1/1976 | Brumlik | 425/381 |

Primary Examiner—Jeffery R. Thurlow
Attorney, Agent, or Firm—Parmellee, Johnson, Bollinger & Bramblett

[57] ABSTRACT

An improved method is described for varying the profile as seen in cross section of an elongated extrudate article. The method provides for varying the profile of an extrusion orifice while an extrudate stock material is being forced through the orifice. An elongated extruded article is formed having a varying profile conforming to the variations in the profile of the extrusion orifice.

4 Claims, 14 Drawing Figures

VARIABLE PROFILE EXTRUSION METHOD

RELATED APPLICATION

This application is a divisional of prior copending application Ser. No. 815,699, filed July 5, 1977, which has issued as U.S. Pat. No. 4,187,068 on Feb. 5, 1980.

BACKGROUND OF THE INVENTION

This invention relates to an improved method for extruding articles and to improved products made thereby. The invention relates more particularly to the fabrication of an extruded article having a profile as seen in cross section which varies along the length of the article.

The need exists for elongated articles having a cross section or profile which varies along the length of the article. More particularly, in the field of horticulture, for example, it is often desirable to provide a means for staking saplings and young trees with an elongated stake which exhibits different requirements with respect to the profile of the stake at different elevations along its length. A sapling stake is intended to be inserted into the soil and to securely form an anchor for maintaining the sapling at a predetermined attitude. A lower segment of the stake profile should be tapered to facilitate insertion into the soil, but nearer the surface of the soil it should exhibit substantial lateral projected area and cross-sectional dimensions in order to resist lateral displacement in the soil to establish a firm anchor in the soil and corresponding relatively greater strength, i.e. greater section modulus, to resist the maximum bending moment which occurs near the soil surface. On the other hand, a resilience or predetermined flexibility in that segment of the stake above the soil is desired to enable the sapling to flex somewhat during its growth under varying atmospheric conditions. A stake having these differing requirements can be provided by varying the profile of the sapling stake along its length and by fabricating it of a material which exhibits a memory characteristic.

When a sapling is supported by unduly rigid stakes, its trunk is not allowed to flex in a natural manner under wind loads. The result is that the trunk of the tree does not develop proper strength for supporting itself under heavier wind loads later on in its life. By suitably tapering the stake a predetermined flexural resilience is provided which tends to match the natural flexibility of the tapering trunk of the sapling. Thereby, the sapling is allowed to flex naturally in all directions under ambient wind conditions. Its trunk develops appropriate strength, and a healthier young tree results when the stake support is removed. In addition to sapling stakes, other articles such as fence posts and the like have differing profile requirements at different elevations along its length. Further desirable characteristics for these articles which are generally maintained outdoors are a resistance to corrosion, fungus, and to decay.

Prior articles intended at least partially to satisfy these requirements have been fabricated of metal or of wood. Metal fence post or stake articles have been formed by the usual well known metal fabricating techniques, and have been relatively expensive, have not exhibited the desired resilience, and are subject to corrosion over a period of time in an outdoor environment. Alternatively, articles of this type are fabricated by woodworking techniques and are conventionally of uniform cross-sectional area, thus being unmatched to the tapering trunk of a sapling. They do not provide the desired flexural resilience and generally do not exhibit the desired overall strength and weathering characteristics. Moreover, wood stakes of uniform cross-sectional area often do not provide sufficient lateral projected area at the soil surface and within the soil. Accordingly, if the soil becomes softened by rain, the stake may readily become displaced laterally and tilt over. Furthermore, unless specially treated, they are readily susceptible to decay and to rot.

These articles may be formed of thermoplastic polymer materials which exhibit the desirable memory, resistance to corrosion and which are not susceptible to decay, fungus and to rot. However, thermoplastic polymer articles are generally fabricated by extrusion or by injection molding. In prior extrusion techniques, a plastic stock material in plasticized or in a liquid form is forced through a die having an orifice of fixed dimensions and having a desired profile or cross-sectional configuration. The article thus extruded has a substantially uniform profile along the entire length of the extruded section.

With respect to injection molding, which involves high pressures, for example, such as 20,000 pounds per square inch, the fabrication of elongated stake or fence post articles requires relatively large, strong expensive dies for injection molding presses. In addition, it is often not possible to produce some of the articles by injection molding because of the need for complex, multiple parting lines in the injection molding die to enable stripping of the product from the molds. Thus, articles having undercuts or multiple fins, for example, could not be stripped from the die without damaging the articles.

Accordingly, it is an object of this invention to provide a method for extruding an elongated article having a variable profile along its length.

Another object of this invention is to provide an elongated article formed of a polymer plastic and having a variable profile along the length of the article.

Still another object of the invention is to provide an elongated article of the type described having mechanical characteristics of relative rigidity and relative flexibility at different locations along the length of the article.

SUMMARY OF THE INVENTION

In accordance with features of the method of this invention, an elongated article having a profile which varies along the length of the article is fabricated by forcing an extrudate stock material in plasticized or liquid form through an orifice which is formed by a plurality of extrusion die members defining an orifice profile. The position of at least one of said members is varied while forcing the stock material through the orifice thereby varying the profile of the orifice and forming an elongated extrudate having a varying profile which conforms to the varying profile of the orifice. In accordance with other features of the method of the invention, the position of a plurality of the extrusion die members is varied intermittently or continuously in an extrusion cycle during which an elongated extruded article is formed.

In accordance with features of the apparatus of this invention, a die block assembly means is provided having a plurality of die block members and an extrusion orifice formed therein by the members. The orifice has a periphery establishing an orifice profile which is defined by edge segments of the plurality of die block members. A means is provided for forcing an extrudate stock material through the orifice to form an elongated extrudate article having a profile conforming to the profile of the orifice. A means is also provided for automatically varying a position of an edge segment of at least one of the die block members for varying the profile of the orifice as the stock material is forced therethrough. An elongated extrudate article having a varying profile is thus provided.

In accordance with other features of the invention, an elongated extrudate article formed of thermoplastic polymer material and having a profile which varies along the length of the article is provided. The article comprises, for example, a sapling stake, a post or other similar article which exhibits the desired resistance to outdoor environment and which is fabricated without the use of relatively expensive injection molding forms and dies.

Examples of other articles which can be made to advantage using the present invention are trim strips or decorative moldings having changing profiles to provide attractive scalloped, serrated or other formed edges or surfaces. Such trim strips may be used for home decoration, both in the interior or exterior. They may be applied on gable ends, eaves, soffits, and so forth, to provide a finished appearance. At the present time, such trim strips and moldings are commercially available as unpainted lengths of wood which have been machined to shape. The user must paint and maintain these decorative wood items to resist weathering. Care in installation to avoid splitting or breaking away of delicate cross-grain contours is required.

It is among the advantages of the present invention that such variable profile decoractive trim strips can be extruded continuously with relatively low tooling costs in pre-colored and finished appearance in readiness to be cut into 8, 10, 12 or 16 foot lengths, as may be desired for marketing. They are durable and do not require the maintenance which is associated with wood trim. Furthermore, commercially available wood trim strips and moldings can exhibit undesired variations in machining techniques from length-to-length, or even several noticeable changes in pattern along various regions of the same strip. In marked distinction to such problems, variable profile extrudate articles produced in accordance with the present invention are produced under controlled conditions to provide predetermined repeatability of the desired patterns with consistent quality and pre-finished appearance ready for installation.

Other types of articles which can be produced to advantage by employing this invention are tapered, multi-faceted furniture legs, fancy banisters and dowels, and the like. As compared with wood from which such furniture parts and decorative dowels have conventionally been produced, there are the same kinds of advantages as discussed above of consistent quality, durability, attractive pre-finished appearance and lack of grain. Although such furniture parts and decorative dowels may be injection molded in certain cases, the present invention enables them to be produced at a lower tooling and lower production costs.

In addition, the present invention enables changes in variable contours and stylized patterns to be made relatively quickly and easily with short "down time" and low changeover costs. Consequently, articles of elongated shape subject to low volume production, runs of multiple pattern styles, can be produced economically.

BRIEF DESCRIPTION OF THE DRAWINGS

These and other objects and features of the invention will become apparent with reference to the following specification and to the drawings wherein.

DETAILED DESCRIPTION

Figures 1, 2, 3, 4, 5, 6, 7, 8:
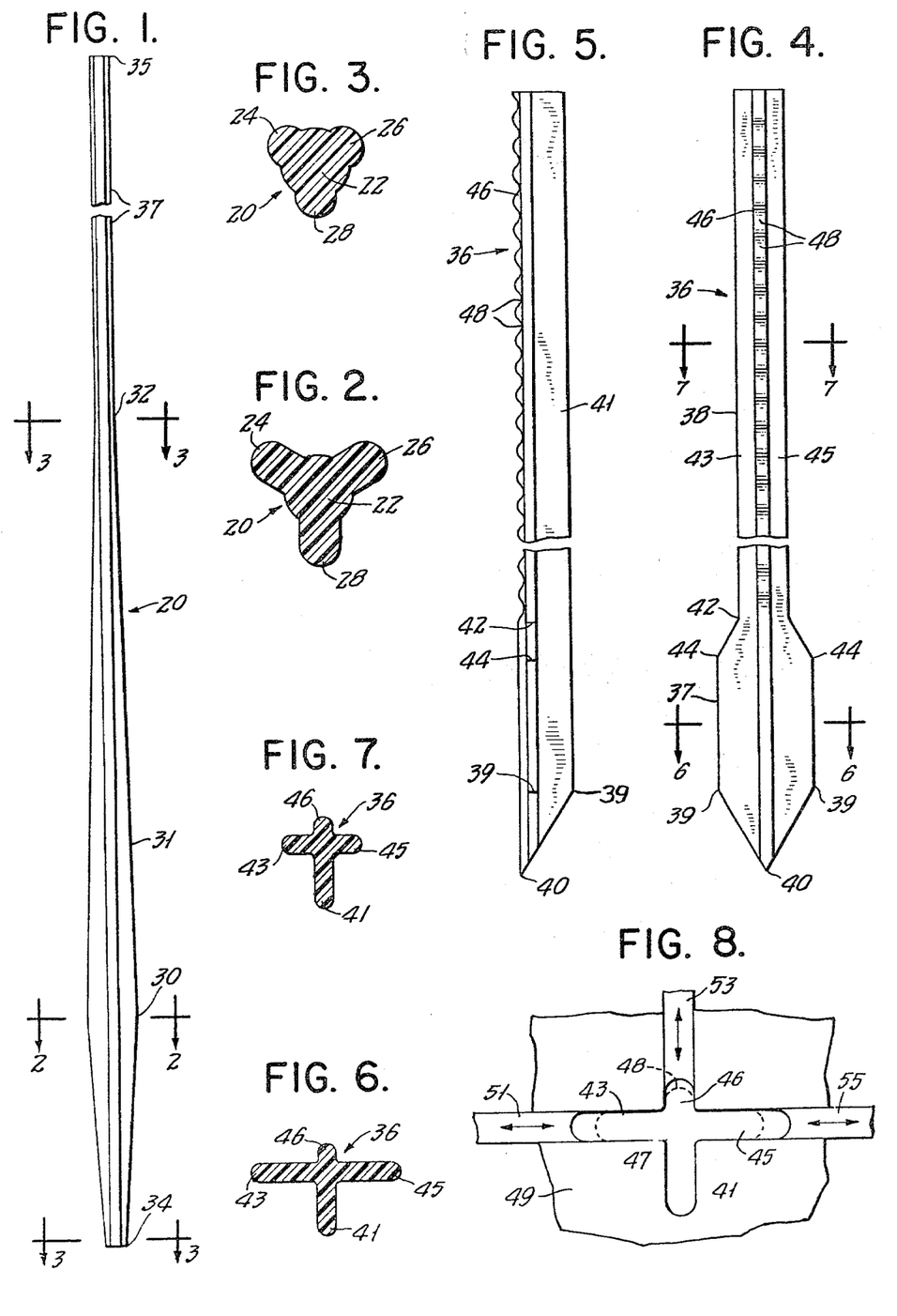
FIG. 1 is a side elevational view of a sapling stake of varying profile constructed in accordance with features of this invention.
FIG. 2 is an enlarged view of a cross section taken along the lines 2—2 of FIG. 1, being a cross section at an elevation near the surface of the earth when the stake is installed in use.
FIG. 3 is an enlarged view of a cross section taken along the lines 3—3 of FIG. 1, being a cross section at an elevation which is more than half of the way up along the stake above the location of the section shown in FIG. 2.
FIG. 4 is a front elevational view of a post of varying profile constructed in accordance with features of this invention.
FIG. 5 is a side elevational view of the post of FIG. 4.
FIG. 6 is an enlarged view of a cross section taken along lines 6—6 of FIG. 4.
FIG. 7 is an enlarged view of another cross section taken along the lines 7—7 of FIG. 4.
FIG. 8 is a fragmentary view of a portion of a die assembly for forming the post of FIG. 4 and constructed in accordance with the features of this invention.

Referring now to FIGS. 1-7, elongated articles having a varying profile along their length and which are formed of a polymer plastic are illustrated. The plastic material used is thermoplastic, as for example high density polyethylene, polyvinyl chloride, polypropylene, and other thermoplastic materials can be used having the desired properties for the particular end use application involved. A sapling stake 20, shown in FIGS. 1-3, has a varying profile. For the purpose of this specification and the appended claims, the term profile means the cross-sectional configuration or the cross-sectional area of an article. In FIG. 2, the stake is shown to have a central segment 22 and fin segments 24, 26 and 28 which extend in a radial direction from the central segment 22. The profile of the stake 20 varies from a maximum at a location 30 along its length to minimum cross-sectional areas at the location 32 and 34 along its length. The sapling stake provides desired characteristics, as enumerated hereinbefore, since it includes a segment extending from location 30 to 34 which is tapered to facilitate insertion into the soil and, at the same time, provides substantial strength and rigidity for anchoring the stake in the soil.

In further explanation, the location 30 is at an elevation along the stake when it is installed in the soil which is near the surface of the soil. The fin segments 24, 26, 28 extend laterally outward and thereby provide a relatively large projected area as seen from any lateral direction. This large projected area is embedded in the soil and strongly resists lateral displacement of the stake in the soil, even when the soil may be soft or spongy after a severe rainstorm. In addition, the section modulus of the stake 20 has a maximum value at the elevation 30 which is intended to be near the soil surface. It is at the soil surface where the bending moment of applied loads on the installed stake are greatest. Consequently, the stake 20 advantageously exhibits its maximum flexural stiffness and strength where the maximum bending moment is applied to it.

On the other hand, the profile of the stake varies continuously providing a continuous tapering length segment 31 from the location 30 to the location 32 which is at an elevation more than half of the way up the stake from the location 30 of maximum section modulus. This changing profile provides various lengths of the stake with a resilient characteristic enabling saplings and other larger plants which are secured thereto a degree of flexure during growth and adverse weather conditions.

By virtue of the fact that the stake 20 tapers over the major portion of its exposed length above the soil surface from location 30 to location 32, it provides a progressively changing flexural resilience which tends to match the natural flexibility of the tapering trunk of the sapling. As explained above, allowing the trunk of the sapling to sway naturally under incident wind loads occurring from day-to-day from the different compass directions advantageously causes the growing trunk to develop strength analogous to the result that appropriate exercise strengthens the limbs of an animal. Fabrication of the stake from a stiffly flexible polymer plastic provides a memory characteristic so that the resilient deflection of the stake length between locations 30 and 35 thereof results in the restoration of the stake to an undeflected attitude upon removal of the deflecting force.

In a particular embodiment, the sapling stake 20 is formed of thermoplastic polymer material, for example such as translucent polypropylene or high density polyethylene, and has an overall length of approximately 8½ feet. The lower portion of the stake varies in profile from the lower tip 34 to the location 30 of maximum section modulus and is approximately 18 inches long. The next portion 31 varies in profile from the location 30 to the location 32 and is approximately 48 inches long. The upper portion 37 from the location 32 to the top 35 is of constant profile and, for example may have a length of 36 inches. The fins 24, 26 and 28 along this upper portion 37 may each be notched slightly to form a set of notches. Such sets of notches may be provided at several different elevations along the upper portion 37 to prevent longitudinal slippage of the cord, twine, fabric strips or bands which may be used to support a sapling from the stake 20 at one or several elevations along the trunk of the sapling. For example, there may be six sets of such notches spaced approximately six inches apart in elevation along the upper stake portion from 32 to 35.

Also, as an illustrative example, the central segment 22 of the stake is shown as being round in section having a radius of approximately 3/16ths of an inch. Each of the fin segments 24, 26 and 28 has a thickness of approximately ⅛th of an inch. Its outer surface is rounded in a semi-circle, as seen in FIGS. 2 and 3, which has a radius of approximately ⅛th of an inch, thereby further protecting the sapling bark from abrasion or scuffing injury. In FIG. 3, the distance from the axial center of the stake to the point on the centerline of each fin segment at the outer surface thereof is approximately 5/16ths of an inch. In other words, at the elevations 32 and 34 each of the fin segments 24, 26 and 28 protrude 5/16ths of an inch from the axial centerline of the stake 20. At the elevation 30 of maximum cross-sectional area, as shown in FIG. 2, each of the fin segments protrudes ½ of an inch from the axial centerline of the stake.

Furthermore, this sapling stake 20 is advantageously formed of translucent plastic material, as indicated above, at least in portions 31 and 37 which are intended to project above the ground. A tree, particularly a sapling, tends to grow away from a dark shadow. Thus, when supported from a wood stake, or a metal pipe, the sapling tends to grow away from the supporting object. This tendency is undesirable because the tree starts out growing somewhat crooked as a result of the shadow effect of the supporting object, resulting in a less attractive or weaker tree than if the trunk were straight and truly vertical. By virtue of the fact that the stake 20 is translucent, for example having an overall pale, milky appearance, light is allowed to pass through the stake and shadow effects are markedly lessened, thereby encouraging the supported sapling to grow straight up along beside a stake which is essentially "invisible" to the young growing tree.

The fence post 36 of FIGS. 4-7 is similarly an elongated body having a varying profile, as illustrated by the differences in the cross-sectional area of the profile at the location 37 and at the location 38. There is a tapering length segment of the post 36, as represented by that portion of the post extending from the location of the lower shoulder 39 to its lower tip or distal end 40. There is also a tapering length segment of the fence post extending from the location of the upper shoulder 44 up to the location 42. It will also be noted in FIG. 5 that a fin segment 46 has a serrated configuration. The serrations 48 with intervening teeth enable the positive non-slip locating and securing of the tie wires, fence lines or fence mesh and the like at desired locations along the length of the post.

This fence post has a wide rear fin segment 41 opposite to the narrow serrated front fin segment 46. This rear fin segment 41, as seen in FIG. 5, is of uniform width along its length, except that it tapers from its shoulder 39 down to the tip 40 for ease of driving into the soil. This taper at the lower end of the uniformly wide rear fin 41 can readily be formed by cutting a triangular piece off from this fin after the variable profile extrusion operation to produce the fence post 36 has been completed. There are two side fin segments 43 and 45 which are relatively wide in the regions between their shoulders 39 and 44, as shown also by the cross-sectional configuration seen in FIG. 6. These wide portions of the fin segments 43 and 45 are intended to be embedded in the soil for providing a large projected area, as seen in the lateral direction, to resist displacement of the fence post in the soil even if the soil is softened by rain. Also, the section modulus of the fence post 36 is greatest in the region between the shoulders 39 and 44 where the bending moments caused by the pull of the fence are greatest.

Since both the post 36 and the sapling stake 20 are formed of a polymer plastic, they exhibit a desirable resistance to deterioration and are not susceptible to decay, rot, rust, corrosion and fungus although utilized primarily in outdoor environments. Moreover, the plastic material provides smooth surfaces which will not splinter to cause piercing injuries to trees or people and will not corrode or scale off to cause rough bumps which injure hands and create rubbing injury or girdling damage to the tree bark. The plastic material will not support insect life or parasites.

An apparatus for forming elongated extrudate articles having a varying profile, such as the stake 20 and the post 36, is illustrated in FIGS. 8–11. As schematically indicated in FIG. 8, the fence post 36 may be variable profile extruded by an extrusion orifice 47 defined by a fixed die block 49 and a plurality of movable die members 51, 53 and 55. The structure and mounting of the movable die members 51, 53 and 55 and the way in which they may be moved radially inwardly and outwardly in controlled cycles will become understood from the following description of an embodiment of the variable profile extrusion method and apparatus for producing the sapling stake 20.

A means for providing an extrudate stock material in plasticized or liquid form is provided and is shown to include a heated extruder barrel 50 (FIG. 11) and means 52 for feeding the plastic material forward in the barrel, for example such as an extruder screw which rotates within the barrel 50. The extrudate stock in pellet or powder form is continuously drawn from a hopper (not shown) into the heated barrel by the action of the rotating screw 52 where it is heated to plasticized or liquid form 33 and is forced at high pressure through a rounded exit port or aperture 54 located at the mouth of the barrel 50. A heated master die plate 60 is mounted to a flange 56 (FIG. 11) surrounding the mouth of the barrel by screw means 61 which extend through bores 62 in this flange and engage internally threaded bores 63 in the plate 60. The master die plate 60 includes a throat aperture 64, having an axis 65 therein, which is centrally formed in the plate and communicates with the extruder barrel aperture 54. Extrudate stock material is forced through the aperture 64 and then through an extrusion orifice, discussed hereinafter.

Figure 10:
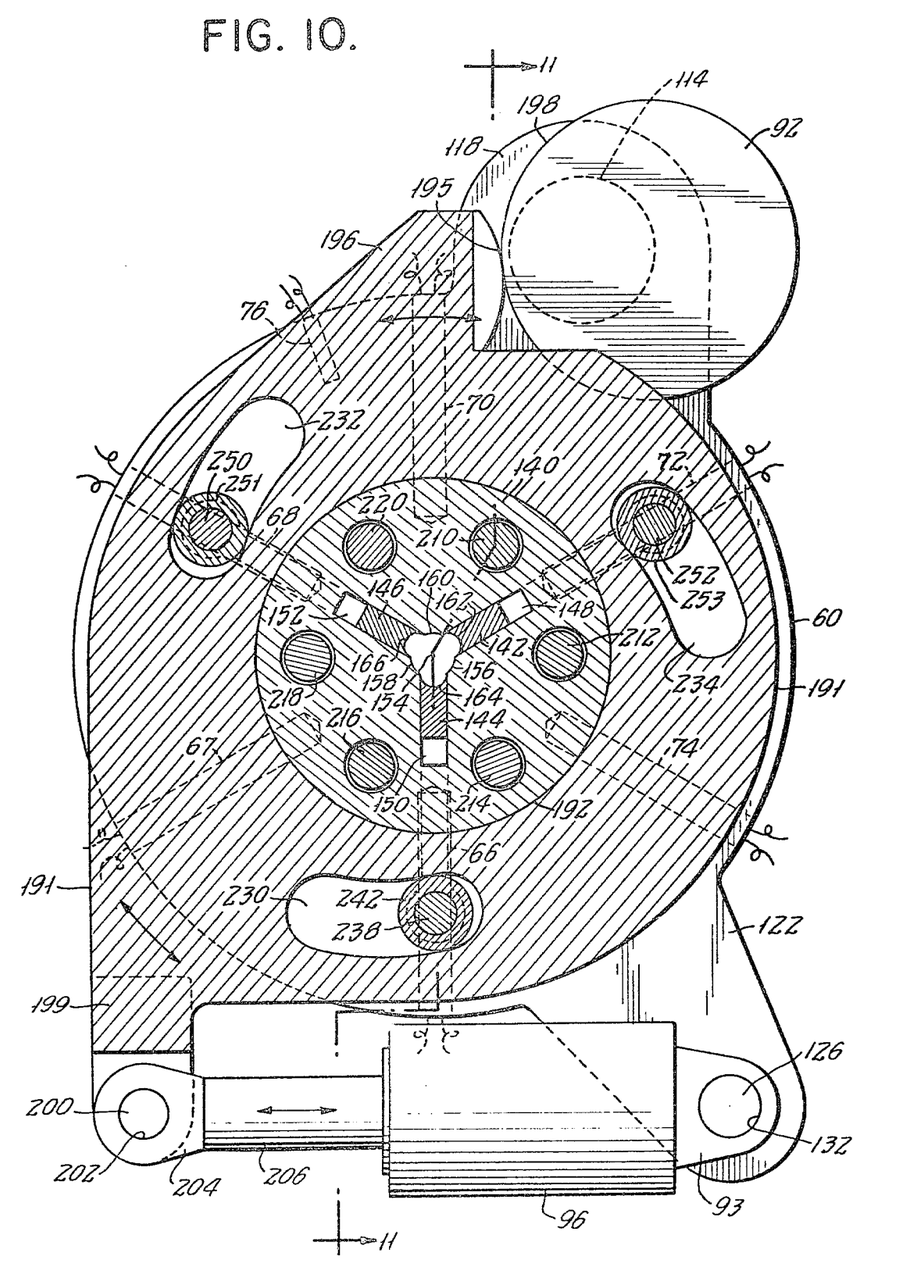
FIG. 10 is a front elevational view, partly in section, of the extrusion die of FIG. 9 and illustrating the die orifice profile for the stake of FIG. 1 at its minimum profile.

Since the viscosity of the stock extrudate is an important characteristic in the extrusion process and is dependent upon its temperature, the master die plate 60 is heated by a plurality of resistance heaters (FIG. 10) 66, 67, 68, 70, 72 and 74. These are thermostatically controlled in accordance with the desired temperature of the plate as determined by a temperature sensing element 76 (FIG. 10). Although a plurality of such temperature sensing elements will be provided, only one such element is illustrated for purposes of simplifying the drawing. During an extrusion process, it is also desirable to monitor the pressure of the extrudate. To this end, a channel 78 (FIG. 11) communicates with the aperture 64 and a pressure sensing element 80 is positioned therein which generates an electrical signal proportional to the extrudate pressure.

Figure 11:
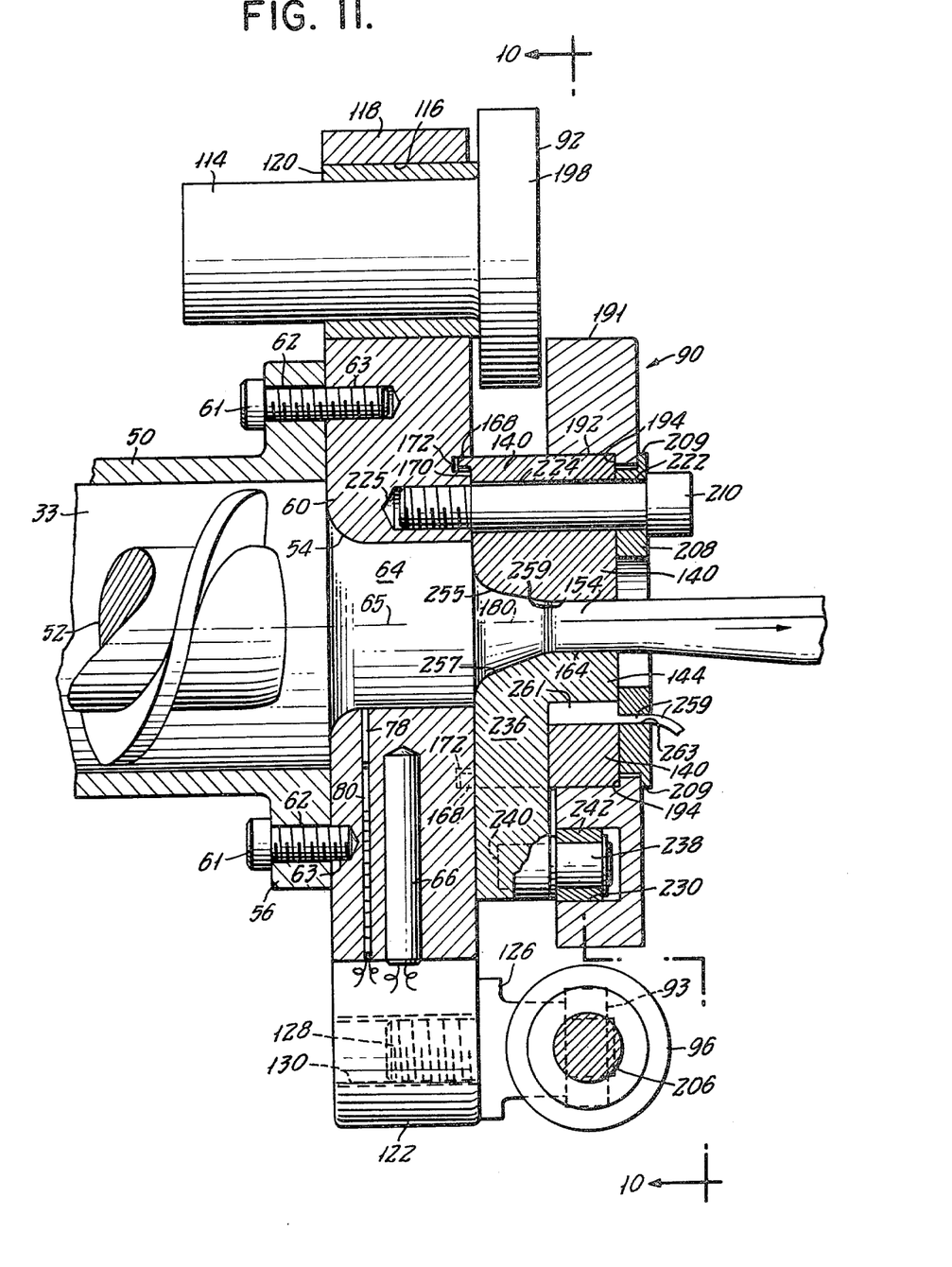
FIG. 11 is a view taken along the lines 11—11 of FIG. 10.

The master die plate 60 provides a support for variable profile extrusion die means referred to generally by reference numeral 90 and for a cam 92. It is to be noted that the master die plate 60 and associated variable profile extrusion die means 90 are shown as relatively massive in structure with a multiplicity of heaters 66, 67, 68, 70, 72 and 74 for providing ample heating capacity. The relatively massive and well heated structure provides a good thermal conductivity throughout itself for maintaining all of the extrusion die parts at essentially the same uniform temperature. The thick master die plate 60 serves as a backing or mount of good thermal conductivity for the die means and thereby enhances the desired tendency to maintain temperature uniformity throughout all die parts affecting the temperature of the thermoplastic material being extruded. In addition, this relatively massive mounting plate and die structure 60, 90 of good conductivity provides a thermal flywheel effect which resists variations in localized temperature in the thermoplastic extrudate. Thus, the temperature of the plastic material is maintained substantially constant to achieve good, uniform flow characteristics in spite of variations from moment-to-moment of volumetric flow through the die orifice, as occurs with changes in cross section of the extrudate.

The mounting plate 60 also provides a pivotal mount for a cylinder support bracket 93 of a pneumatic return cylinder 96 which serves as a spring for causing the die means 90 to follow the motion of the cam 92, as will be explained. The cam 92 is driven by a shaft 114 to which rotary motion is imparted by a motor (not shown) which is energized in accordance with a predetermined program for actuating a member of the die extrusion means 90. A bore 116 is formed in a bracket segment 118 of the plate 60 and a cam shaft rotary bearing 120 is positioned in the bore. Another bracket segment 122 of the plate 60 supports the cylinder mounting bracket 93. A spacer pivot mount 126, having a threaded shank 128, is provided for supporting the cylinder 96 at a spaced apart position from the plate 60. The threaded shank 128 of mount 126 engages an internally threaded bore 130 formed in the bracket segment 122 while an opposite end of the mount extends as a pivot through a bore 132 (FIGS. 9 and 10) in the cylinder bracket 93 and provides a pivotal mounting for this cylinder. Means, such as a cap nut or cotter pin (not illustrated) are provided for maintaining the pivot 126 in engagement with the bore 132.

The extrusion die means 90, referred to hereinbefore, comprises a plurality of die block members which form an extrusion orifice. At least one of the die block members is movable. In FIG. 10, the die block members are shown to comprise an annular shaped stationary member 140 and a plurality of movable members 142, 144 and 146. The stationary die block member 140 includes a plurality of radially extending grooves 148, 150 and 152 formed therein in which the movable members 142, 144 and 146 are positioned respectively and which provide rectilinear guides for these members.

The plurality of die block members form an orifice which is referred to generally by reference number 154 and which has a periphery outlining an orifice profile. This periphery and the orifice profile are defined by edge segments 156, 158 and 160 of the stationary die block member 140 and by edge segments 162, 164 and 166 of the movable die block members 142, 144 and 146, respectively. The annular stationary die block member 140 includes an annular flange 168 (FIG. 11) extending from a surface 170 and engaging an annular groove 172 formed in the master die plate 60. The flange 168 and the groove 172 enable alignment of the stationary die block member 140 with the plate 60 thereby aligning and locating an axis 180 of the orifice 154 with the axis 65 of the master die plate 60.

A means for varying the position of an edge segment of at least one of the die block members and thus the profile of the orifice 154 as stock extrudate material is forced through this orifice, is provided and includes an annular shaped actuator ring 191, the cam 92 and its drive, the cylinder 96, and drive means providing engagement between the ring 191 and the movable die member. The actuator ring 191 is positioned on and rotates about a bearing surface 192 of the stationary die block member 140. A lip 194 formed in the actuator ring limits axial movement of the ring 191 in a first axial direction relative to the stationary die block member 154. A cam follower surface 195 (FIG. 10) is provided on a bracket 196 of the ring and is engaged by a peripheral surface 198 of the cam 92. The ring also includes an integrally formed extending bracket 199 having a pin 200 supported therein for engaging a bore 202 formed in an end bracket 204 of the piston rod 206.

The stationary die block 140, the movable die block members 142, 144 and 146 located in grooves of the stationary die block 140 and the rotary actuator ring 191 comprise a die assembly which is mounted to the master die plate 60 by an annular shaped retainer ring 208 (FIG. 9) and a plurality of screws 210-220. These screws extend through a plurality of bore holes in the plate 208 as exemplified in FIG. 11 by the bore 222 through which the screw 210 extends, and through a plurality of corresponding bores in the stationary die block 140, as exemplified by the bore 224. These screws engage a plurality of associated internally threaded bores in the master die plate 60, as exemplified by the internally threaded bore 225 in this plate. As shown in FIG. 11, a peripheral lip 209 on the retainer ring plate 208 overlaps the interior lip 194 of the movable actuator ring 191 for preventing the ring 191 from moving in the downstream direction.

Radial inward and outward movement of the movable die block members 142, 144 and 146 is effected by rotation of the actuator ring 191. The pneumatic cylinder 96 biases the actuator ring 191 in a clockwise direction as viewed in FIG. 10 since the cylinder member bracket 93 is coupled to the stationary bracket 122 while the piston rod 206 is coupled to the bracket 199 which is integral with rotatable ring 191. A pneumatic pressure is initially established for creating this clockwise bias of the ring 191. As the cam 92 rotates, it forces the cam follower surface 195 and the ring 191 to rotate in a counterclockwise direction against the biasing pressure within the cylinder 96. This pressure maintains the follower surface 195 against the cam surface 198 and thereby turns the ring 191 in a clockwise direction as permitted by motion of the cam surface.

Figure 9:
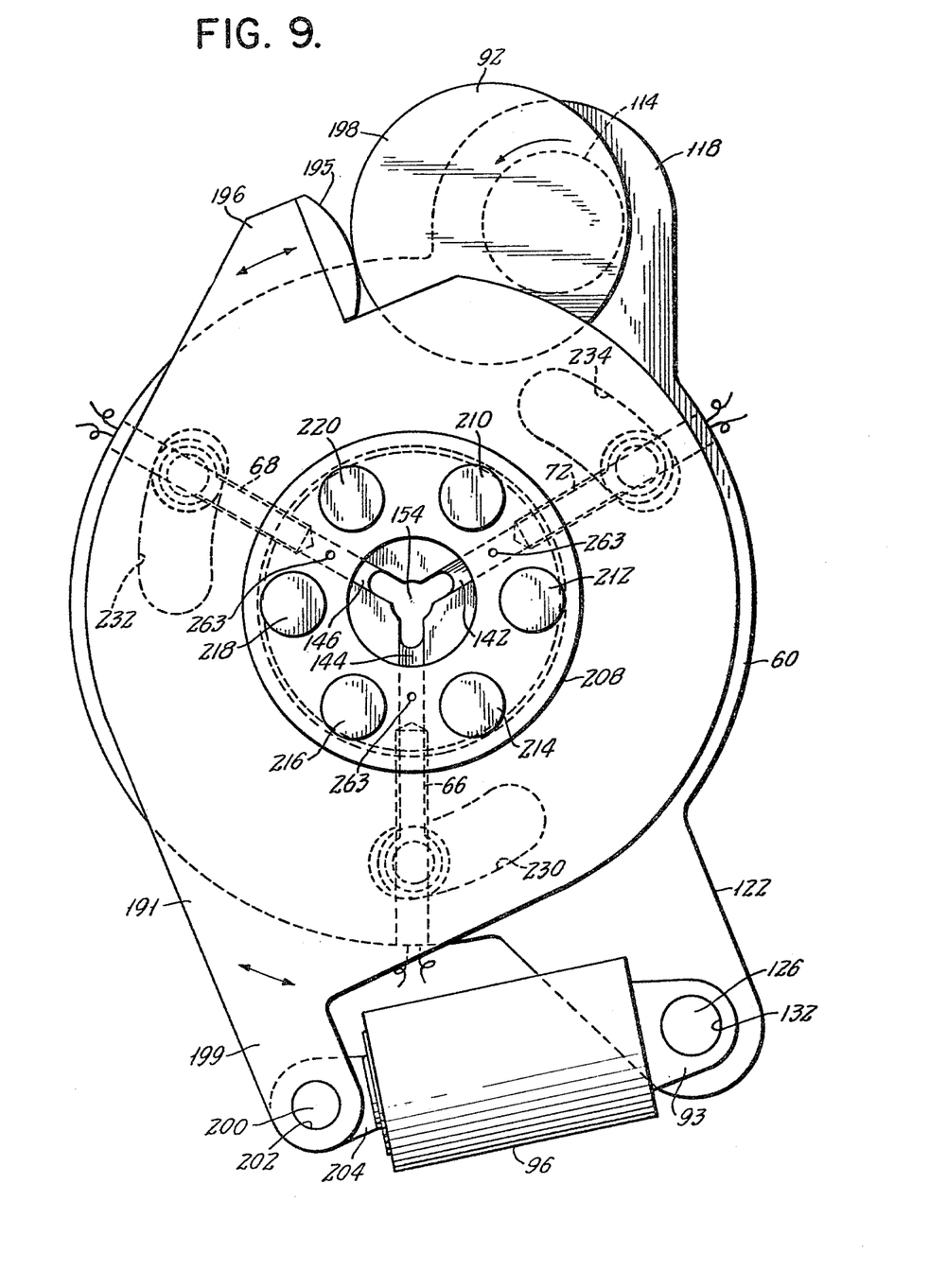
FIG. 9 is a front elevational view of an extrusion die constructed in accordance with the features of this invention and illustrating the die orifice profile for the stake of FIG. 1 at its maximum profile.

During an extrusion cycle, the movable die block members are advanced in a radial direction toward the axis 180 of the orifice 154 thereby varying the orifice profile for decreasing the width of the fin segments, as viewed in FIG. 10, during one portion of an operating cycle, or are retracted away from the axis 180 in a radial direction for varying the orifice profile for increasing the width of the fin segments, as viewed in FIG. 9, at another position of the operating cycle. This movement is effected by rotary motion of the actuator ring 191. A plurality of grooves 230, 232 and 234 are formed in the actuator ring 191 thereby providing control cams for controlling the respective positions of the movable die block members 142, 144, 146, as will be explained later.

Each of the movable die block members, as exemplified by the die block member 144 in FIG. 11, is generally L-shaped in the radial plane and includes an orifice forming inner edge segment in the form of a first leg 164 of the L-shape, and a radially outwardly extending stem segment 236 forming a second leg of the L-shape. A pin 238 is press fitted into a bore 240 formed in a lower portion of the second leg 236 of the L-shape. A roller or bearing sleeve 242 is positioned about the pin 238. This assembly of the pin 238 and the roller bearing 242 extend into the groove 230 formed in the actuator ring 191. Similar cam follower pin and roller assemblies 250, 251, 252, 253 (FIG. 10) are positioned in other cam grooves 232 and 234 of the actuator ring. It can be seen that the grooves 230, 232 and 234 are each inclined in the radial direction for providing that the respective ends of these inclined cam grooves are located at a different radial distance from the axis 180 of the orifice. Thus, upon rotation of the actuator ring 191, the inclined cam grooves will cause the cam follower assemblies 238, 242; 250, 251; and 252, 253 of the movable die members to move in a radial direction with respect to the axis 180 of the orifice 154. The edge segments of the movable die block members are caused to advance or retract correspondingly, and the profile of the orifice is thereby varied. The particular movement of the edge segments of the movable die block members and thus the profile of the orifice will be determined during an extrusion cycle by the configuration of the cam 92 and by the configuration of the cam grooves 230, 232 and 234.

As seen in FIG. 11, the fixed die block 140 has a streamlined convergent entry region 255 extending downstream from the entry face of orifice 154. Similarly, each of the movable die block members, as exemplified by the movable die block member 144, has a streamlined convergent entry region 257 extending downstream from this entry face. These streamlined convergent regions 255 and 257 guide the extruding plastic material 259 to flow unimpeded into the die orifice 154 without upstream disturbances.

As shown in FIG. 11, in order to allow for the escape of any plastic material which may force itself outwardly along the outwardly extending side surfaces of the stem portion 236 of the movable die block member 144, there is a small bleed port 263 in the retainer cover ring plate 208. This bleed port 263 communicates with the clearance space 261 outside of the inner segment 164 of the movable die block member 144. Similar bleed ports 263 (as seen in FIG. 9) are provided for the corresponding clearance spaces of the other movable die block members 142 and 146. A small amount of plastic material 259 can be seen issuing from the bleed port 263.

For producing the sapling stake 20, an extrusion cycle will be completed after the cam 92 makes one full revolution. During this movement of the cam, the extruder screw 52 is continuously forcing stock extrudate material in plasticized or liquid form from the extruder barrel 58, through the master die plate aperture 64 and through the orifice 154. An elongated article having a cross sectional profile corresponding to the profile of the orifice 154, as it is varied during the cycle, will thus be extruded through the orifice 154. An elongated article having a varying profile along its length is thereby provided during one extrusion cycle. Extrusion is generally continuous and a plurality of articles will thus be formed, which can subsequently be cut from one another to complete the finished article.

In addition to the apparatus illustrated in FIGS. 9, 10 and 11 of the drawings for providing the extrudate article, various other known means employed in an extrusion apparatus including extrudate stock hopper, heating means for the extruder barrel, cooling bath means for the extrudate, and extrudate puller means which are well known in the extrusion arts are employed but are not illustrated for purpose of simplifying the drawings and the description thereof.

The variable profile extrusion method and apparatus thus described exhibits several advantages. In addition to providing the desired variable profile for an extruded article, the assembly of dies, actuator ring and cam is readily mounted and demounted for substituting various different arrangements of die members in order to effect various different profile configurations. It will be noted from the drawings that the rotary actuator ring, the stationary and movable die block members, and the cam can be readily demounted by the steps of disengaging the mounting screws 210-220 and the piston rod from the pin 200. Thus, the apparatus described is versatile in that various die block members adapted to provide desired profiles can be readily substituted.

Figure 12:
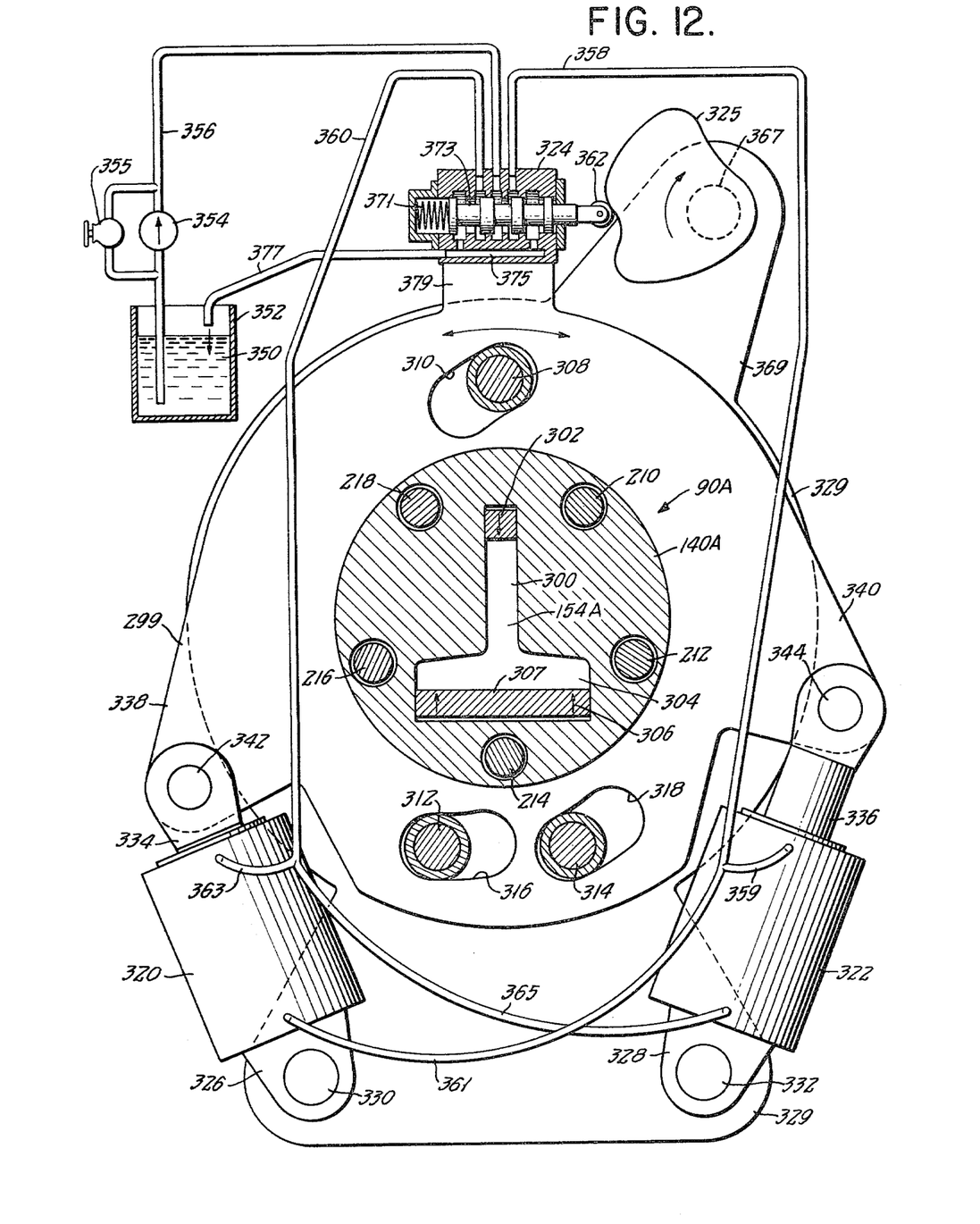
FIG. 12 is a front elevational view, partly in section, of an extrusion die constructed in accordance with an alternative embodiment of the invention.

FIG. 12 illustrates an alternative means for rotating an actuator ring 299 during an extrusion cycle. As can be seen from FIG. 12, the profile of the article being extruded has a T-shaped configuration. The T-shaped profile can be altered in that the length of the stem fin segment 300 can be varied by movement of a die block member 302, while the thickness 304 of the head of the T can be altered by movement of the die block member 306. The die block member 302 is actuated by a cam follower assembly 308 located in an inclined cam groove 310. This cam follower assembly 308 is similar to the cam follower assemblies 238, 242; 250, 251; and 252, 253 shown most clearly in FIG. 10. The movable die block member 306 is actuated by movement of two cam follower assemblies 312 and 314 which extend into a pair of identical inclined cam grooves 316 and 318, respectively. Because of the relatively large radial forces exerted during the extrusion process on the relatively large die surface 307 of the movable die block member 306, this movable die block member is provided with the dual cam follower assemblies 312 and 314 acting in concert for transmitting the actuating force to this member at two separate places spanned across its relatively large width.

It is to be understood that the movable die block members 302 and 306 cooperate with the stationary die block member 140A in a manner analogous to that shown and described in detail in conjunction with FIG. 9. The machine screws 210-218 serve to secure the variable profile die means 90A to a corresponding master die plate 239 which is generally similar to the master die plate 60 as shown in FIG. 11. The variable profile die orifice 154A communicates with an aperture corresponding to the aperature 64 (FIG. 11).

In FIGS. 9-11, movement of the actuator ring 191 was effected by the mechanical transmission of an actuating torque to the ring 191 from the cam 92 via the cam follower surface 195 while the restoring torque on this ring was provided by the pneumatic cylinder 96 acting on a movable arm 199.

In FIG. 12, rotary movement of the actuator ring 299 during an extrusion cycle is accomplished by hydraulic cylinders 320 and 322, a spring loaded hydraulic tracer valve 324 which is mounted on and rotated with the ring 299 and by a cam 325. Brackets 326 and 328 of the hydraulic cylinders 320 and 322, respectively, are pivotally mounted to a master die plate 329 by pins 330 and 332, respectively. Piston rods 334 and 336 are coupled to bracket segments 338 and 340 of the actuator ring 299 by pins 342 and 344, respectively. The piston rods are coupled to the ring 299 at different circumferential locations in push-pull torque relationship for producing a powerful driving torque on the rotary ring in each respective direction when the hydraulic cylinders 320 and 322 are appropriately pressurized.

An hydraulic fluid 350 is supplied from a reservoir 352 via a pump 354 and a conduit 356 to the tracer valve 324. A hand operated by-pass pressure-relief valve 355 is provided in parallel circuit relationship with the pump 354 for relieving any excess pressure which might occur downstream of the pump. The tracer valve 324 which is actuated by the cam 325 distributes the hydraulic fluid 350 under pressure through a conduit 358 for causing clockwise rotation of the ring 299, as viewed in FIG. 12, or to a conduit 360 for causing counterclockwise rotation of the ring. The hydraulic fluid under pressure in the conduit 358 is coupled to the hydraulic cylinders 320 and 322 by flexible branch lines 361 and 359 for causing extension of the piston 334 from the cylinder 320 and simultaneous retraction of the piston 336 into the cylinder 322, thus providing a powerful push-pull effect in exerting clockwise torque on the rotatable ring 299. Similarly, the hydraulic fluid under pressure in the conduit 360 is distributed to the cylinders 320 and 322 by flexible branch lines 363 and 365 for causing retraction of the piston 334 into the cylinder 320 and extension of the piston rod 336 from the cylinder as illustrated in FIG. 12. Thus, powerful counterclockwise torque is exerted on the rotatable ring 299.

The use of dual hydraulic cylinder means for actuation of the ring 299 enables the application of relatively higher die actuation forces than is provided with the cam drive arrangement of FIGS. 9-11. It also results in balancing the torque forces being applied on the opposite sides of this ring and the reaction forces of the driven cam follower assemblies 308, 312 and 314, thereby minimizing frictional effects during the actuation of the movable die members in a variable profile extrusion process.

The advantageous actuation of the hydraulic cylinders through the use of a control cam 325 which is not bearing any significant load and a tracer roller 362 operating the tracer (or servo) valve 324 enables relatively abrupt changes in cylinder control motion and rapid changes in the profile of extruded articles. The cam 325 may be rotated by any convenient source of rotary motion applied to its shaft 367 which is journalled in a bracket 369 on the master die plate 329. The spring 371 in the tracer valve 324 biases the valve spool plunger 373 toward the right in FIG. 12 and maintains the follower roller 362 in contact with the revolving cam surface 325.

Thus, when the valve spool 373 moves to the right of its neutral position, it causes the hydraulic cylinders 320 and 322 to produce clockwise rotation of the actuator ring 299. When the valve spool is in its neutral position, it causes the actuator ring 299 to be held temporarily stationary. When it moves to the left of neutral position, it produces counterclockwise rotation of the actuation ring.

The hydraulic fluid returns through either of the conduits 358 or 360, as the case may be, and is discharged through a valve passage 375 and a line 377 returning to the reservoir 352.

It is to be noted that the tracer valve 324 is mounted on a bracket 379 extending from the periphery of the rotatable ring 299. Therefore, the movement of the valve spool plunger relative to the housing of the tracer valve 324 is a resultant of the action of the cam 325 plus the action of the movable bracket 379. Consequently, fairly rapid and complex variations in profile of the orifice 154A can conveniently be produced.

Figures 13, 14:
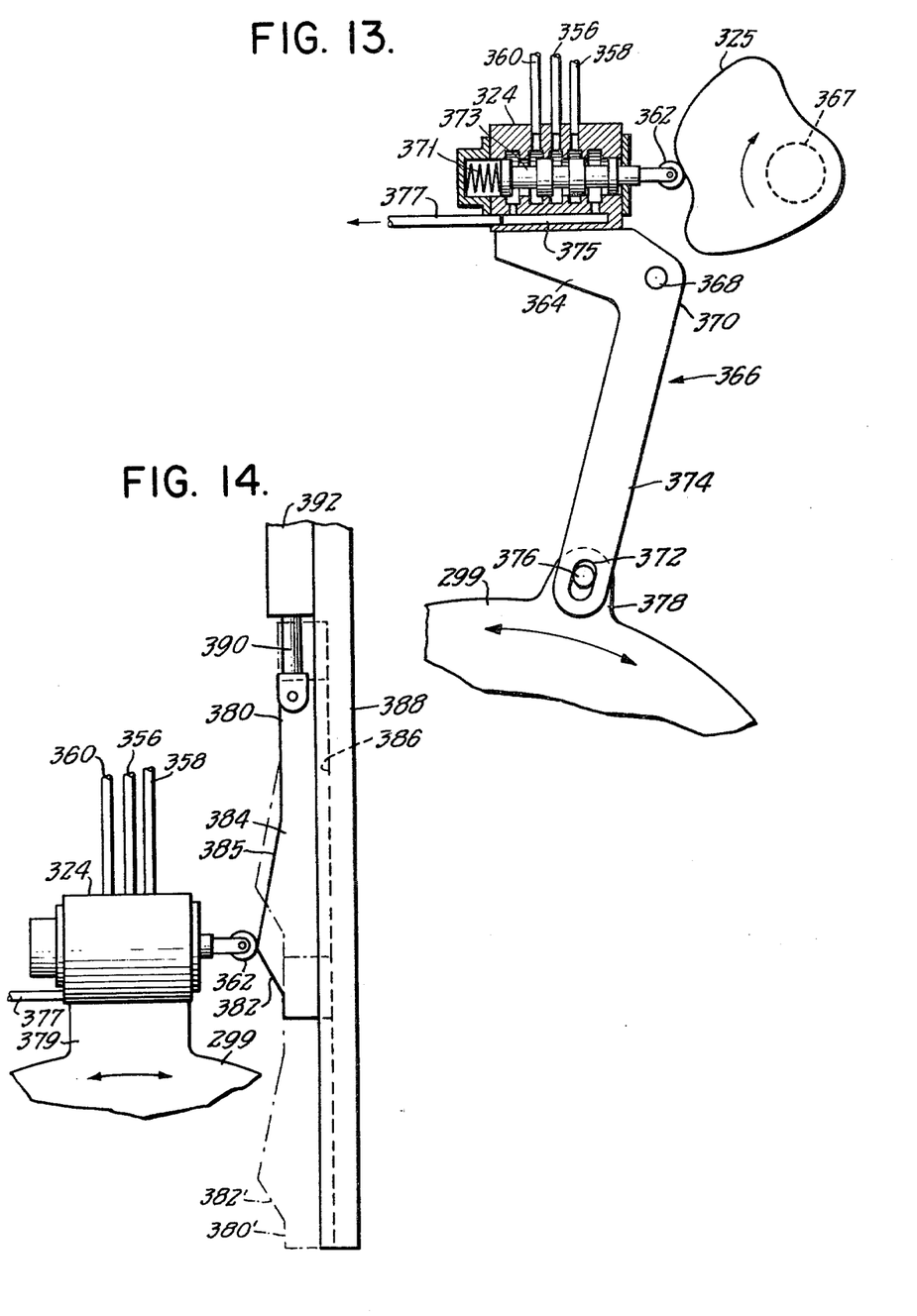
FIG. 13 is an alternative arrangement for a die profile actuating means of FIG. 12.
FIG. 14 illustrates a further alternative arrangement for a die profile actuating means of FIG. 12.

At times it may be desirable to provide even more rapid changes in positioning of the actuating ring 299. While the arrangement of FIG. 12 enhances such movement, relatively quick changes in the position of the actuating ring are limited to some extent by the ability of the tracer roller 362 to follow the profile and ramp angles of the control cam 325. In FIG. 13, there is illustrated an apparatus for further multiplying and amplifying the amplitude and slopes of the cam configuration with a tracer valve mechanical lever linkage which accomplishes relatively quicker and multiplied response of the actuator ring 299 for very rapidly varying the profile of the extruder die.

In FIG. 12, the tracer valve 324 is supported on an arm 379 on the actuator ring 299 and was transported therewith during its rotary motion, as discussed above. In the arrangement of FIG. 13, the tracer valve 324 is supported on a lever arm 364 of a lever system 366 forming a mechanical linkage for coupling the tracer valve in an articulated manner to the periphery of the rotatable ring 299. This arm 364 is pivotally supported by a fixed pivot 368 at an elbow region 370 of the lever linkage 366. A coupling slot 372 is formed at the end of another longer arm 374 of the lever 366, and a pin 376 which is secured to a bracket 378 near the periphery of the ring 299 engages in the slot 372.

Thus, relatively small movements of the servo valve 324 cause mechanically multiplied movements of the rotatable actuator ring 299, depending upon the relative lengths of the two lever arms 364 and 374. The servo valve plunger 373 is advantageously enabled to follow the cam profile in spite of relatively rapid or abrupt movements of the actuator ring 299. Moreover, the angular attitude of the axis of the valve plunger 373 relative to the axis of the cam shaft 367 changes as the arm 364 swings about the pivot 368 for providing various control effects. As a result, the tracer valve is permitted to accomplish relatively more complex, varied higher speed and larger amplitude control actions in producing the resultant movement of the extrusion die members and accordingly to provide relatively more abrupt, repeatable and complex variations in the article profile as desired.

At times, a linear cam profile rather than an annular cam profile may be desired for actuating the tracer valve 324. FIG. 14 illustrates an arrangement for linear actuation of this valve. A longitudinally movable cam plate 380 is provided having a first ramp 382 of relatively steep slope and a second ramp 384 of relatively less steep slope. The tracer roller 362 is maintained in engagement with the edge 385 of the cam plate which is reciprocated within a track or groove 386 of a fixed support frame 388. The linear cam plate 380 is actuated by a piston rod 390 of a pneumatic cylinder 392 mounted on the support 388.

This linear cam arrangement can be used to provide the same general pattern of variable profile extrusion as the annular cams of FIGS. 9–13. The ramp segments 382 and 384 can be adapted to have equivalent profiles, if desired, in which case the cam plate 380 can be reciprocated in opposite directions at the same rate to provide the same variable profile. In other words, each extension and each retraction of the piston rod 390 can be arranged to produce a complete operating cycle, if desired.

If it is desired to produce two lengths of elongated articles having the same relative proportions in the same production run, the cam plate 380 can be driven back and forth in opposite directions at different speeds. Thus, an alternating sequence of relatively longer and shorter articles of varying profile are produced as a continuous extrusion. They are then cut apart from each other and are ready for marketing.

It is to be understood that when using the motion amplifying lever linkage 366 on FIG. 13 the hydraulic connection for causing retraction and extension of the piston rods 334 and 336 are reversed from those as shown in FIG. 12; so that the valve 324 will continue to operate as a servo valve. Thus, when the valve spool 373 moves to the right of its neutral position in FIG. 13, it produces counterclockwise rotation of the actuator ring 299, thereby causing the lever arm 364 and the valve 324 to move toward the right. When the valve spool 373 is in its neutral position, it causes the actuator ring to be held temporarily stationary. When it moves to the left of its neutral position, it produces clockwise rotation of the actuator ring, thereby causing the lever arm 364 and the valve 324 to move toward the left. The movement of the servo valve 324 is much less than the multiplied movement of the actuator ring 299.

If desired, a lever system similar to that shown in FIG. 13 can be employed for moving the servo valve 324 in FIG. 14. The connections to the hydraulic cylinders should always be such that the valve 324 in FIG. 14 will operate as a servo valve. Thus, when the cam follower 326 moves to the right of its neutral position in FIG. 14, the servo valve 324 should move to the right, and vice versa.

There has thus been described an improved method for fabricating an improved elongated extruded article of variable profile. Although particular embodiments of the invention have been described herein, it will be apparent to those skilled in the art that variations may be made thereto without departing from the spirit of the invention and the scope of the appended claims.

I claim:

1. A method for extruding an elongated article having a profile which remains the same in at least one radial direction along its length and which may be varied in at least three other radial directions along its length comprising the steps of:

forming an orifice in a fixed die member which is stationary in at least one radial direction and which may be varied in at least three other radial directions using a plurality of movable extrusion die members, forcing a thermoplastic extrudate stock material in flowable form through said orifice, and varying the position of at least two of said movable die members while forcing said stock material through said orifice thereby maintaining the profile the same in at least one radial direction while simultaneously varying the profile of the orifice in at least two other radial directions for forming an elongated extrudate article having a constant profile in at least one radial direction and a varying profile in at least two radial directions conforming to the varying profile of said orifice.

2. The method of claim 1, wherein said article is formed during an extrudate forming cycle and the position of said members is varied continuously during said cycle.

3. The method of claim 1, wherein said article is formed during an extrudate forming cycle and the position of said members is varied during a part of said cycle.

4. The method of claim 1, wherein the positions of at least three members are varied while forcing said stock material through said orifice.

* * * * *